United States Patent [19]

Büchner

[11] Patent Number: 5,498,482
[45] Date of Patent: Mar. 12, 1996

[54] POLYMER-CONTAINING MIXTURE

[75] Inventor: Klaus Büchner, Schaffhausen, Switzerland

[73] Assignee: Alusuisse-Lonza Services Ltd., Switzerland

[21] Appl. No.: 403,073

[22] Filed: Mar. 13, 1995

[30] Foreign Application Priority Data

Mar. 24, 1994 [CH] Switzerland .......... 888/94-8

[51] Int. Cl.⁶ .......... B32B 15/08; C08L 51/08
[52] U.S. Cl. .......... 428/461; 525/63; 534/414; 534/427; 534/436; 534/437
[58] Field of Search .......... 428/461; 525/63; 524/414, 427, 436, 437

[56] References Cited

U.S. PATENT DOCUMENTS 5,217,812  6/1993  Lee .......... 428/461

FOREIGN PATENT DOCUMENTS 0326775  8/1989  European Pat. Off. .
0334205  9/1989  European Pat. Off. .
0406035  1/1991  European Pat. Off. .

*Primary Examiner*—Paul R. Michl
*Assistant Examiner*—Mark L. Warzel
*Attorney, Agent, or Firm*—Bachman & LaPointe

[57] ABSTRACT

Polymer-containing mixture with elevated resistance to flow under the influence of heat that can be processed e.g. into core layers in multi-layered composite panels. The polymer-containing mixture may, with reference to the total mixture, contain 50 to 75 wt. % filler material such as aluminum hydroxide or magnesium hydroxide and 25 to 50 wt. % of a polymer mixture. The polymer mixture may contain e.g.

a) 65 wt. % copolymer of ethylene and acrylic or methacrylic acid or vinylacetate
b) 17.5 to 20 wt. % terpolymer of ethylene, n-butylacrylate and carbon monoxide and
c) 15 to 17.5 wt. % grafted polymer of a terpolymer of ethylene, n-butylacrylate and carbon monoxide with maleic-anhydride.

12 Claims, No Drawings 5,498,482

POLYMER-CONTAINING MIXTURE

BACKGROUND OF THE INVENTION

The present invention relates to a polymer-containing mixture exhibiting elevated resistance to low under the influence or heat.

Because of their organic structure, polymers or plastics are always combustible. Depending on the application of such polymers or plastics this combustibility is dangerous and restricts the use of plastics. There have therefore keen no scarcity of attempts to reduce the combustibility of plastics. For example the plastics may be mixed with fillers in the form of inorganic substances. For example plastics or polymers such as polyvinylchloride, polyolefins, polyamides. polyesters etc., may be mixed homogeneously with fillers such as aluminum hydroxide, magnesium hydroxide, magnesium carbonate, calcium carbonate, silicon oxides etc., in order to reduce the combustibility. In order to reduce the flammability of polymers adequately, the amount of filler material must be increased very greatly, e.g. up to 70 wt. %. This has of course a considerable effect on the properties of the polymers. With an elevated content of filler material the plastic becomes e.g. brittle, losing elasticity in comparison with the starting polymer, which is a disadvantage for many applications. With increasing content of filler material the ease of processing the plastics further decreases and extrusion or calendering processes can be performed only poorly or not at all.

As a rule plastics containing fillers exhibit significantly better performance under conditions of fire i.e. the temperature of ignition is higher and the burning plastic may also be self-extinguishing. With increasing mount of heating, however, the plastics tend to melt and very often polymeric melts that drip while burning are viewed negatively. This type of behavior is very pronounced e.g. in the case of polyolefins such as polyethylene and polypropylene. On the other hand plastics from the polyolefin group are among the most preferred plastics as they are easy to process, contain no heavy metal additives, are easy to recycle, and in case of fire release no toxic substances.

SUMMARY OF THE INVENTION

The object of the present invention is to propose a polymer-containing mixture which can e.g. be processed by extrusion or calendering, which in case of tire is noncombustible or is difficult to ignite, and under the influence of heat and fire does not give rise to dripping especially of burning polymer melt.

That object is achieved by way of the invention in the form of a polymer-containing mixture comprising as a whole 50 to 75 wt. % filler and 50 to 25 wt. % of a polymer mixture which in turn contains a) 50 to 70 wt. % copolymer of ethylene and acrylic or methacrylic acid or vinylacetate, b) 15 to 25 wt. % terpolymer of ethylene, n-butylacrylate and carbon monoxide and c) 15 to 25 wt. % grafted polymer of a terpolymer of ethylene, n-butylacrylate and carbon monoxide with maleic-anhydride.

The percentage values concerning the amounts of filler and polymer-containing mixture refer to 100 wt. %. of the total mixture. The percentage values concerning the polymer mixture refer to 100 wt. % of the polymer mixture, which in turn accounts for 50 to 25 wt. % of the total mixture.

DETAILED DESCRIPTION OF PREFERRED EMBODIMENTS

Advantageously, the polymer mixture contains, referring to the 100% polymer mixture, a) 65 wt. % copolymer of terpolymer of ethylene and acrylic or methacrylic acid or vinylacetate b) 17.5 to 20 wt. % terpolymer of ethylene, n-butylacrylate and carbon monoxide and c) 15 to 17.5 wt. % grafted polymer of a terpolymer of ethylene, n-butylacrylate and carbon monoxide with maleic-anhydride.

The preferred filler material is aluminum hydroxide or magnesium hydroxide or any desired mixtures thereof.

The filler may contain up to 25 wt. %. preferably 12 to 15 wt. % with reference to the filler itself, extender substances from the following: calcium carbonate, Huntite $Mg_3Ca(CO_3)_4$, hydro-magnesite $Mg_4(CO_3)_3(OH)_2 \cdot 2H_2O$, basic magnesium carbonate, chalk or mixtures thereof, or formulations containing red phosphorus. An exemplary mixture contains Huntite and hydro-magnesite.

The aluminium hydroxide may for example exhibit an average particle size of 0.7 to 2.5 microns and a minimum particle size of 0.5 microns. the filler material may be employed in the commercially available form or, if desired, dried before use.

If the polymer-containing mixture contains extender substances, as mentioned above, then the following may e.g. find application for that purpose: a calcium carbonate having an average particle size of 1 to 3 µm and minimum particle size of 0.5 µm and maximum particle size of 7 µm, Huntite and hydro-magnesite having an average particle size of 0.2 to 5 µm and minimum particle size of 0.2 µm and maximum particle size of 7.0 µm or basic magnesium carbonate or magnesium hydroxide having an average particle size of 0.5 to 1.5 µm and minimum particle size of 0.5 µm and maximum particle size of 3 µm. If the extender substance employed is a formulation containing red phosphorus, then this may be in the form of a master batch, for example having EVA as carrier substance. The amount of phosphorus, expressed as a percentage with respect to the total mixture, is usefully 2 to 5 wt. %. By making use of synergistic effects, the filler content may be reduced by more than 2 to 5 wt. %, e.g. 4 to 8 wt. %.

The polymer-containing mixture according to the invention may also contain a silane cross-linking system or the reaction products of a silane cross-linking system. The silane cross-linking system comprises a silane compound, a peroxide compound and a catalyst to accelerate the condensation reaction. The silane compound may be e.g. tri-methoxyvinylsilane which forms a bridge between the filler and the polymers in the polymer-containing mixture. To create the bridges, alkoxy groups are hydrolysed, and the OH-groups formed react under condensation with the basic constituents in the surface of the filler; in the presence of a radical binder, such as e.g. a peroxide, the vinyl groups react with polymers. As a result of this cross-linking a further improvement is achieved in the thermal stability of the polymer-containing mixtures according to the invention. The silane compound, catalyst and peroxide may be employed in the commercially available form or, preferably as a master batch containing EVA as polymer carrier. The active ingredients in the silane cross-linking system may for example be present in concentrations amounting 0.2 to 2 wt. % with respect to the whole mixture.

Further, the polymer-containing mixture may contain further additives such as are necessary for processing in an extruder e.g., stabilizer systems and lubricants such as stearic acid paraffin or polyethyl-gylcol having an average molecular weight of 400. The percentage values refer to the mixture as a whole.

Stabilizers that can be used are for example antioxidants. Suitable antioxidants are for example alkylized monophenols, alkylized hydrochinones, hydroxylized thiodiphenylethers, alkylideae-bis-phenols, benzyl compounds, acylaminophenols, esters of beta-(3.5-di-tert.butyl-4-hydroxyphenyl)-propionic acid, esters of beta-(5-tert. butyl-4-hydroxy-3-methyl-phenyl)-propionic acid, esters of beta-(3.5-dicyclohexyl-4-hydroxyphenyl)-proprionic acid or amides of beta-(3.5-di-tert.butyl-4-hydroxyphenyl)-proprionic acid.

The above mentioned and further stabilizes with antioxidant or acid-captive behavour may be added to increase the stability of the polymers in the polymer-containing mixture during processing: these are for example added in concentrations of 0.05 to 0.5 wt. % with reference to the whole mixture. With increasing fraction of filler material in the polymer-containing mixture the specific weight also increases. This may lead to an undesirable increase in the weight of products containing the mixture and, because of the large amounts of material, may make the product more expensive. For that reason it may be useful to add a chemical or physical foaming agent to the polymer-containing mixture according to the invention. Foaming agents that may find application here are e.g. azodicarbonamide, if desired along with additives that lower the decomposition point, hydrazine derivatives, such as e.g. 4,4'-Oxybis (benzolsulphohydrazide), or endothermic foaming agents such as e.g. modified salts of polycarbonic acids. Other foaming agents are gases or liquefied gases such as e.g. nitrogen, carbon dioxide, hydrofluorcarbons, butane or propane etc. The amount to be added depends on the degree of foaming to be achieved. The foaming action may produce a reduction of up to 20%, preferably 10%, in the specific weight of the polymer-containing mixture, this with reference to the density of the untreated polymer-containing mixture. As a rule the foaming agent is added to the polymer-containing mixture according to the invention and activated during processing e.g. in an extruder or autoclave.

The processing of individual components into the polymer-containing mixture may take place, for example in a first exemplary fashion, by manufacturing the polymer mixture in a tumbler type mixer and then feeding the polymer mixture into the inlet of an extruder. The filler material, extender substances and any other additives, stabilizers and the silane cross-linking system in granular form are added via another one or two side-feeding inlets on the extruder. The polymer-containing mixture according to the invention emerges e.g. from a wide-slit nozzle at the end of the extruder as material in sheet form. In a second exemplary version the processing is as described, however, instead of the wide-slit nozzle a granulating nozzle is employed and a granular compound is produced. Subsequently, in a second step, a single screw extruder with wide-slit nozzle is employed to process the granulate into shaped forms. The silane cross-linking system may be added in the first and also in the second stage of the process.

The polymer-containing mixture according to the invention may for example be processed by extrusion or calendering into flat or curved sheet or profiled sections, hollow sections, tubes etc. having a thickness or wall thickness of e.g. 1 to 5 mm, preferably 1.5 to 4 mm. The processing temperature lies as a rule between 100° and 170° C., in the case of extrusion preferably 130° to 150° C. The parts in the form of panels etc. may be employed as building components or be worked further into building components.

For that reason the present invention also encompasses building components containing the polymer-containing mixtures according to the invention. Usefully, panel-shaped parts are made out of the polymer-containing mixtures and processed further into multi-layered composite panels with at least one of the layers containing the polymer-containing mixture according to the invention. Such multi-layered composite panels may for example contain one or two outer layers of plastic or metal, the latter being preferred. Preferred are multi-layered composite panels having outer layers of metal, preferably aluminum or its alloys and at least one core layer out of the polymer-containing mixture according to the invention. Such composite panels may have for example outer layers of metal with a thickness of 0.2 to 1.0 mm and a 1.5 to 4 mm thick core layer of polymer-containing mixture according to the invention. Because of their high fire resistance, such building components and in particular composite panels are suitable e.g. as panels for facades, walls, floors or ceilings in multi-storied buildings, as wall, floor or ceiling panels in means of transport such as vehicles or ships or as dividing or decorative walls, display panels, display elements etc.

I claim:

1. Polymer-containing mixture, which comprises a polymer containing mixture including (a) 50 to 75 wt. % filler and (b) 50 to 25 wt. % of a polymer mixture, wherein the polymer mixture contains a) 50 to 70 wt. % copolymer of ethylene and acrylic or methacrylic acid or vinyl-acetate, b) 15 to 25 wt. % terpolymer of ethylene, n-butylacrylate and carbon monoxide, and c) 15 to 25 wt. % grafted polymer of a terpolymer of ethylene, n-butylacrylate and carbon monoxide with maleic-anhydride, said polymer-containing mixture exhibiting resistance to flow under the influence of heat.

2. Polymer-containing mixture according to claim 1, wherein the polymer mixture contains a) 65 wt. % copolymer of terpolymer of ethylene and acrylic or methacrylic acid or vinyl-acetate, b) 17.5 to 20 wt. % terpolymer of ethylene, n-butylacrylate and carbon monoxide, and c) 15 to 17.5 wt. % grafted polymer of a terpolymer of ethylene, n-butylacrylate and carbon monoxide with maleic-anhydride.

3. Polymer-containing mixture according to claim 1, wherein the filler contains a material selected from the group consisting of aluminum hydroxide, magnesium hydroxide and mixtures thereof.

4. Polymer-containing mixture according to claim 1, wherein the filler contains up to 25 wt. % extender substances selected from the group consisting of calcium carbonate, Huntite, hydromagnesite, basic magnesium carbonate and mixtures thereof.

5. Polymer-containing mixture according to claim 1, wherein the filler contains up to 25 wt. % of an extender substance including formulations containing red phosphorus.

6. Polymer-containing mixture according to claim 4, wherein the filler contains extender substances in amounts of 12 to 15 wt. %.

7. Polymer-containing mixture according to claim 5, wherein the filler contains extender substances in amounts of 12 to 15 wt. %.

8. Polymer-containing mixture according to claim 1, wherein the polymer mixture contains a silane cross-linking system.

9. Polymer-containing mixtures according to claim 1, wherein a building component contains said polymer-containing mixture.

10. Polymer-containing mixtures according to claim 1, wherein a building component in the form of a multi-layered composite panel contains said polymer-containing mixture in at least one layer thereof.

11. Polymer-containing mixtures according to claim 1, wherein a building component in the form of a multi-layered composite panel containing outer layers of metal and at least one core layer, contains said polymer-containing mixture as at least one core layer of the composite panel.

12. Polymer-containing mixtures according to claim 11, wherein said metal is aluminum or its alloys.

* * * * *